United States Patent
Howarter et al.

(10) Patent No.: US 7,746,223 B2
(45) Date of Patent: *Jun. 29, 2010

(54) SYSTEM AND METHOD FOR RECEIVING SECURITY CONTENT FROM WIRELESS CAMERAS

(75) Inventors: Jamie C. Howarter, Overland Park, KS (US); Charles M. Lesher, Louisburg, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 447 days.

This patent is subject to a terminal disclaimer.

(21) Appl. No.: 11/607,526

(22) Filed: Dec. 1, 2006

(65) Prior Publication Data

US 2008/0129498 A1 Jun. 5, 2008

(51) Int. Cl.
*G08B 29/00* (2006.01)
*G08B 3/00* (2006.01)
*H04N 7/173* (2006.01)
*H04N 7/14* (2006.01)

(52) U.S. Cl. ............... 340/506; 340/328; 340/330; 340/531; 340/539.1; 340/825.72; 379/167.05; 379/167.07; 348/14.01; 348/143; 725/110; 455/3.06

(58) Field of Classification Search .......... 340/506, 340/328, 330; 379/167.05, 167.07
See application file for complete search history.

(56) References Cited

U.S. PATENT DOCUMENTS

| | | | | |
|---|---|---|---|---|
| 5,428,388 A * | 6/1995 | von Bauer et al. | ......... | 348/155 |
| 6,476,858 B1 * | 11/2002 | Ramirez Diaz et al. | ..... | 348/159 |
| 6,753,774 B2 * | 6/2004 | Pan et al. | ............... | 340/539.11 |
| 7,015,943 B2 * | 3/2006 | Chiang | ....................... | 348/143 |
| 7,062,291 B2 * | 6/2006 | Ryley et al. | .............. | 455/556.1 |
| 7,109,860 B2 * | 9/2006 | Wang | .................... | 340/539.11 |
| 2003/0135860 A1 * | 7/2003 | Dureau | ....................... | 725/82 |
| 2004/0086093 A1 * | 5/2004 | Schranz | ...................... | 379/37 |
| 2006/0063517 A1 * | 3/2006 | Oh et al. | .................... | 455/415 |
| 2008/0111684 A1 * | 5/2008 | Zinser | ........................ | 340/541 |
| 2008/0129821 A1 * | 6/2008 | Howarter et al. | ............ | 348/143 |

* cited by examiner

*Primary Examiner*—Donnie L Crosland
(74) *Attorney, Agent, or Firm*—Sonnenschein Nath & Rosenthal LLP

(57) ABSTRACT

A system and method for displaying security content to a cell phone. An indication is received that a doorbell has been activated. A signal is sent to the cell phone indicating that the doorbell has been activated.

20 Claims, 7 Drawing Sheets

SYSTEM AND METHOD FOR RECEIVING SECURITY CONTENT FROM WIRELESS CAMERAS

BACKGROUND

Security systems employing cameras have long been used by businesses and other organizations as a way to provide security and privacy. Frequently, such security systems, require complex integrated systems with multiple monitors and a processing system or other elements for coordinating and controlling feeds and security content from the different cameras. Business security systems are often hardwired or may require installation during construction of the building. In many cases, security systems are not an easy add-on to a home. As a result, most security systems that use cameras are too complex and expensive for a user to implement in a home setting. Additionally, many after market security systems are not easily integrated into a home without appearing out-of-place or creating a poor aesthetic.

Home security is particularly important when the user needs to answer the doorbell, has small children, or is away from the home temporarily or for extended periods of time. Existing systems for viewing security content while in the home or at a remote location are often complex and unreliable. In many cases, a user may be required to use specialized security equipment that is not easily incorporated into a home environment. For example, the security system may require an exclusive data processing system and extensive wiring to function properly. In order to view security content a user may be inconveniently required to go to a room designated for the voluminous amounts of security hardware. As a result, existing security systems are not easily integrated and do not allow efficient access to security content in or away from the home. In most cases, it is impossible to know conveniently when security content has been recorded in or away from the home. Most users cannot justify using a home security system with cameras based on the limitations and overall cost.

SUMMARY

The present invention provides additional safety and security to users of set top boxes and wireless devices, a system and method for individuals to receive security content from wireless cameras. The use of such a system provides additional security to individuals by making security content more readily available both within the home and at remote locations.

The first embodiment includes a system and method for displaying security content to a cell phone. An indication is received that a doorbell has been activated. A signal is sent to the cell phone indicating that the doorbell has been activated.

The second embodiment includes a cell phone security system. A doorbell may indicate that an individual is present at the doorbell. The doorbell sends a signal indicating the doorbell is activated. A wireless camera may communicate with the doorbell for recording security content of the individual at the doorbell. The wireless camera records the security content when the signal is received. A cell phone may communicate with the wireless camera an indicates to a user that the signal is received and displays the security content to the user.

Yet another embodiment includes a method for indicating security content is available to a cell phone. The method includes receiving an indication that security content is received. A sound linked with the security content is played. The security content is displayed to the cell phone.

BRIEF DESCRIPTION OF THE DRAWINGS

Illustrative embodiments of the present invention are described in detail below with reference to the attached drawing figures, which are incorporated by reference herein.

DETAILED DESCRIPTION OF THE DRAWINGS

Certain embodiments of the present invention provide a system and method for automatically displaying security content received from wireless cameras by a set top box connected device or wireless device, such as a cell phone. Security content may include still pictures, video, video clips, streaming video, or other feeds, as viewed, recorded, or streamed by the wireless cameras or wired cameras. The security content is wirelessly displayed to the user for alerting the user of guests, intruders or other camera activity. The wireless camera may be constantly monitoring, or may monitor or record based on motion sensors, sounds, a doorbell, events, sensors, or other presence detection devices. The security content may be automatically displayed by the cell phone, a computer with an Internet connection, or to a display connected to the set top box. Alternatively, an alert may be generated before the security content is displayed to inform the user that security content is forthcoming or may be viewed at the option of the viewer.

Figure 1:
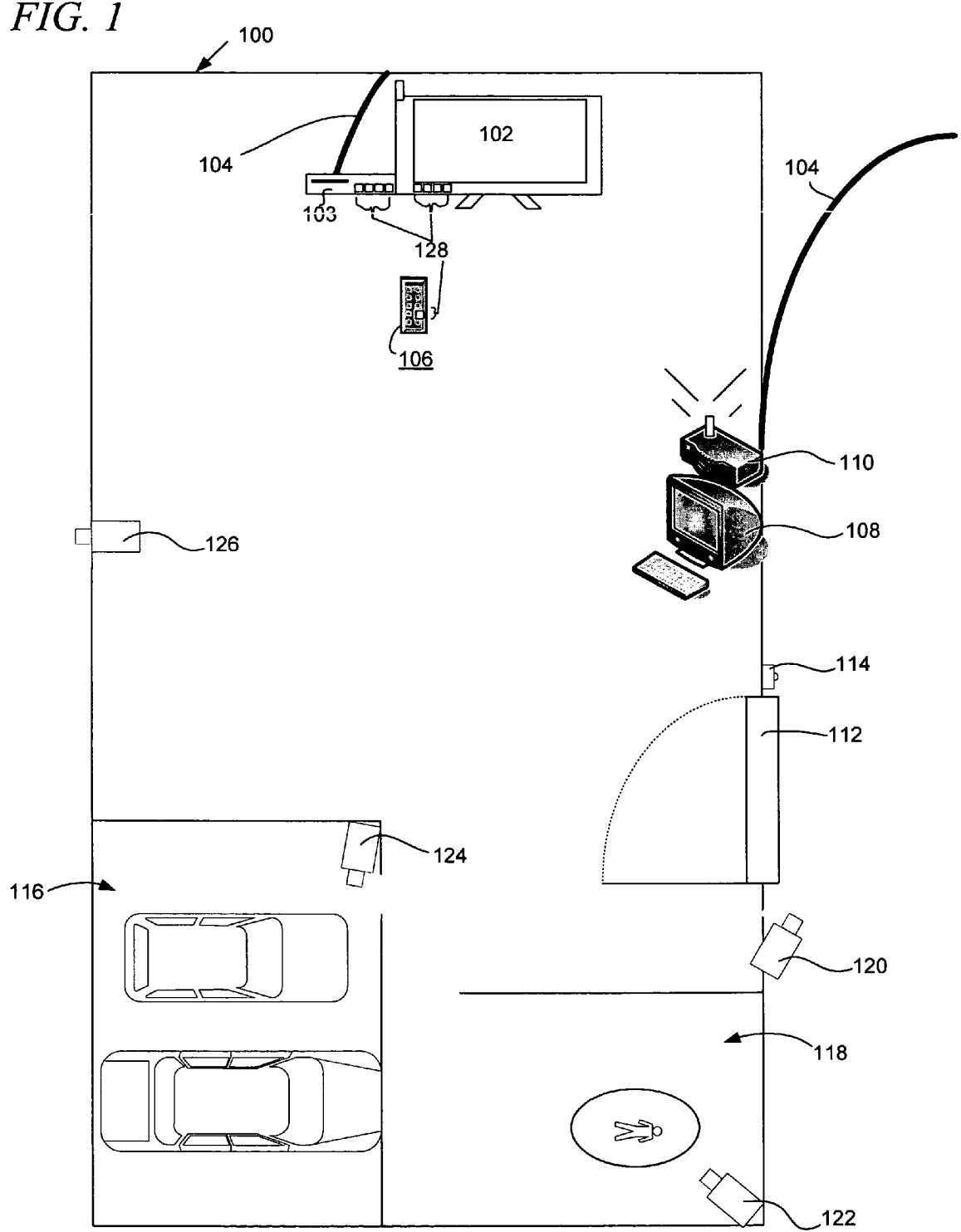
FIG. 1 is an illustration of a home using a set top box security system in accordance with the illustrative embodiments of the present invention.

FIG. 1 is an illustration of a home using a set top box security system in accordance with the illustrative embodiments of the present invention. The home 100 as shown in FIG. 1 is an example of a dwelling structure. In other embodiments, the home 100 may be a business or other structure where people live, work or otherwise congregate. The home 100 includes various security and communications components which may include a television 102, a set top box 103, a television connection 104, a remote control 106, a personal computer 108, a wireless router 110, a door 112, and a doorbell 114.

The television 102 is a display device that displays television content and programs. The television 102 may display either digital or analog signals. The television 102 may be a CRT monitor, an LCD television, an Internet protocol television, a plasma television, or other display device suitable for displaying images and media content to a user. The set top box 103 is a device for providing television and security content to the television. The set top box 103 may communicate information to the television 102 wirelessly or through a wired connection, such as an electrical or fiber connection. In one example, the set top box 103 is a cable box provided by a cable or satellite television/Internet provider. In another example, the set top box 103 is or may include an enhanced digital video recorder for displaying television content and recording and displaying security content as needed. The television connection 104 may be a hard wired line such as fiber-optic, DSL, cable, Ethernet, twisted-pair or other communication medium suitable for communicating data. The televisions connection 104 may alternatively be a wireless connection for receiving television content and security content. The data may be received from a satellite, cable, telephone, cellular, Internet service or other communications service provider. The set top box 103 may be used to select the normal viewing content, order programs, record programs, and control the television 102 as specified by the user.

The remote control 106 is a device that controls the content, performance and other functions of the television 102 and/or set top box 103. The personal computer 108 is a data processing system that executes programs and instructions. The wireless router 110 is a wireless base station that transmits and receives wireless signals. The doorbell 114 is a device for informing a user of the presence of an individual at the door 112 and may be touch, motion or presence sensitive. Home 100 may include any number of floors, rooms, layouts or configurations. A garage and a nursery are shown for describing one embodiment of the present invention.

The home 100 includes a number of wireless cameras including front door camera 120, nursery camera 122, garage camera 124, and back yard camera 126. Alternatively, the home 100 may include any number of hardwired cameras as an alternative to the wireless cameras. In one embodiment, the wireless cameras are backup or redundant cameras to hardwired cameras. The wireless cameras may also include night vision, infrared, electromagnetic, or thermal imaging. The description of wireless cameras and hardwired cameras may be used interchangeably in connection with the embodiments described herein. Each wireless camera is a visual communication device that communicates images, video, or streaming video wirelessly. Each wireless camera is positioned to view a different portion of the exterior or interior of the home 100. For example, the user may want to view the front door, nursery, garage and back yard for security or personal reasons. The user may prefer to monitor their child, an expensive vehicle, or a pool.

In one embodiment, a user programs the set top box 103 to display one or more of the wireless camera views or security content on one or more channels of the television 102. The process for establishing the channel is further described in FIG. 4. The set top box 103 includes camera view selectors 128 or camera buttons, for selecting which camera view to display. The television 102, the remote control 106 and other wireless devices may also include camera view selectors 128.

In one embodiment, the camera view or security content replaces regular viewing content of the television 102, such as a television show or DVD movie. The regular viewing content is the media typically received and displayed by the television 102 including content such as cable, satellite, video feeds, video inputs, and other data normally viewed by the user. The security content may be displayed to the user according to user preferences and configuration of the set top box 103. In one embodiment, the security content is temporarily displayed to the television 102 or displayed until the user takes some action or selects to return to the regular viewing content.

In another embodiment, the camera view is an overlay so that both a camera view and regular content may be viewed at the same time using differing levels of transparency. For example, when the doorbell 114 is pushed activating the front door camera 120, the camera view may be displayed transparently over a news program the user is watching so that both the news program and view from the front door camera 120 may be seen. In another embodiment, the regular viewing content and one or more camera views are displayed using a picture-in-picture (PIP) feature that is displayed simultaneously on the television 102. Some televisions displays may already have a channel designated for picture-in-picture display. When the set top box 103 receives security content, the set top box 103 may automatically change the channel of the television 102 to the designated channel or otherwise engage the picture-in-picture feature. The set top box 103 may also present the user the option to view the security content at the present or at a later point in time. The camera view selectors 128 may be the picture-in-picture button of the set top box 103, television 102, or the remote control 106. The user may use the remote control 106 and camera view selectors 128 to switch between camera views displayed on the television 102.

The set top box 103 may also be configured to power on the television 102 when the doorbell 114 is pushed. Alternatively, the set top box 103 may be configured by the user to flash the security content to the television 102 to attract the attention of a person in the home 100. The set top box 103 may also be configured to sound a special alert or to have the television 102 emit a specialized sound or signal indicating that live security content is or has been received. The set top box 103 may be connected to multiple televisions or displays which may be configured to display security content from the wireless cameras. For example, the television 102 may display a view of the nursery from the nursery camera 122.

In another embodiment, the set top box 103 may display a pop-up box or small indicator on the television 102 that informs the user that security content is being received or was previously recorded. For example, the pop-up box may be a small box with the caption "motion detected on camera 4 in the back yard." Alternatively, the pop-up box may indicate that "security content recorded @4:00 p.m. when the doorbell was pushed" and display a still or video image of the security content in the pop-up box. The pop-up box may be used to provide a security content display and capture system similar to voicemail in which captured or live security content may be selected and viewed based on a user request. For example, security content that was previously recorded may be viewed as desired by the user. The user may elect to view all security content at one time or as recorded using the set top box 103. The pop-up display may be used by the user to elect to view new security content or offer the user the opportunity to record or save the security content for delayed viewing at a later time.

In one embodiment, a camera view is automatically displayed by the set top box 103 to the television 102 based on activity at one of the cameras. For example, the front door camera 120 and the back yard camera 126 may be motion sensitive. As a result, the camera views from the front door camera 120 and the back yard camera 126 are displayed on the television 102 automatically. In another embodiment, the wireless camera view of the front door camera 120 is displayed on the television 102 and a user's cell phone in response to an individual engaging the doorbell 114. This allows a user viewing the television to be automatically alerted to the presence of an individual at the door 112. The front door camera 120 functions as an electronic peep hole for validating identity before authorizing entry into the home 100. The wireless cameras of FIG. 1 may communicate with the set top box 103, the television 102 and the personal computer 108. In one embodiment, the set top box 103 the personal computer 108, the wireless router 110 and the wireless cameras communicate using an 802.11 standard. However, these wireless devices may communicate using Bluetooth® or other communications protocols suitable for short-range wireless data transfer.

In another embodiment, the wireless cameras may stream security content to the wireless router 110 and the personal computer 108. The security content received from the front door camera 120 may be saved on the set top box 103, a hard drive of the personal computer 108, a separate digital video recorder (DVR) connected to the television 102, a network based DVR or to the television 102 itself. For example, the security content from the front door camera 120 may be streamed through the television connection 104 to a network based DVR for storage. In another embodiment, the security content may be streamed from the set top box 103 to a secured website for recording the security content. As a result, the customer could log in using a password and view security content recorded at the home 100 or being streamed live to the home 100 at anytime.

The set top box 103 may also send an email, SMS, or other form of text, graphic, video, or other message to a mobile device through an internet protocol network and a wireless network. For example, the user may establish preferences for sending security content, security content alerts, or recorded security content to specified email, instant messaging identifications, or text message accounts. The user may further specify that only security content activity detected from specified cameras, such as the back door camera 126, is to be sent in an email message. The security content may be sent by the set top box 103 as an attachment, streaming data, an alert, or a link to download information from the set top box 103 or a secure server.

The features of one embodiment of the present invention are particularly useful because a user viewing the television 102 may selectively view security content from any of the wireless cameras using the camera view selectors 128. In one embodiment, the camera view selectors 128 are selection devices or indicators designated specifically for selecting which camera view to display on the television 102. However, the camera view selectors may be any mechanical or electronic indicator suitable for selecting a channel on the television 102, the remote control 106, or cell phone. The camera view selectors 128 may have default values for each of the wireless security cameras or may be programmed by a user based on individual preferences and the number of wireless security cameras in the home 100.

The television 102 may be connected to any number of peripheral devices for displaying alternative content. For example, the television 102 may be connected to a gaming system, a media system such as a digital video player, digital video recorder or any other device that streams television content or media to the television 102. In one example, a user is watching the television 102. As an individual approaches the door 112 and touches the doorbell 114, the set top box 103 receives a wireless signal from the front door camera 120 that displays the camera view of the individual, such as a package delivery person, on a portion of the television 102. As previously described, the image or security content displayed by the front door camera 120 may encompass the entire viewing display of the television 102, or a portion, such as a window in the upper right hand corner of the television 102, based on defined user preferences. As a result, the user may determine whether to open the door 112 either manually or using a button on the set top box 103, television 102, or remote control 106 to automatically disengage locks or otherwise open or permit access through an entrance based on the content displayed from the front door camera 120 to the television 102. The user may also use the security content displayed to the television 102 to selectively answer the door to avoid salespeople, pesky neighbors, or other unwanted visitors.

In another example, the user may have a small child in the nursery 118. The user may utilize the remote control 106 and corresponding camera view selectors 128 to view the security content displayed by the nursery camera 122. This allows the user to verify the status of a child in the nursery 118 without disturbing the child by opening a door or otherwise entering the room. In yet another example, the user may set preferences on the television 102 to intermittently or randomly display security content from the front door camera 120, the nursery camera 122, the garage camera 124, and the back yard camera 126 in the upper right hand corner of the television 102. This feature allows a user to check the security status of the house 100 without significantly interrupting normal content viewing.

Figure 2:
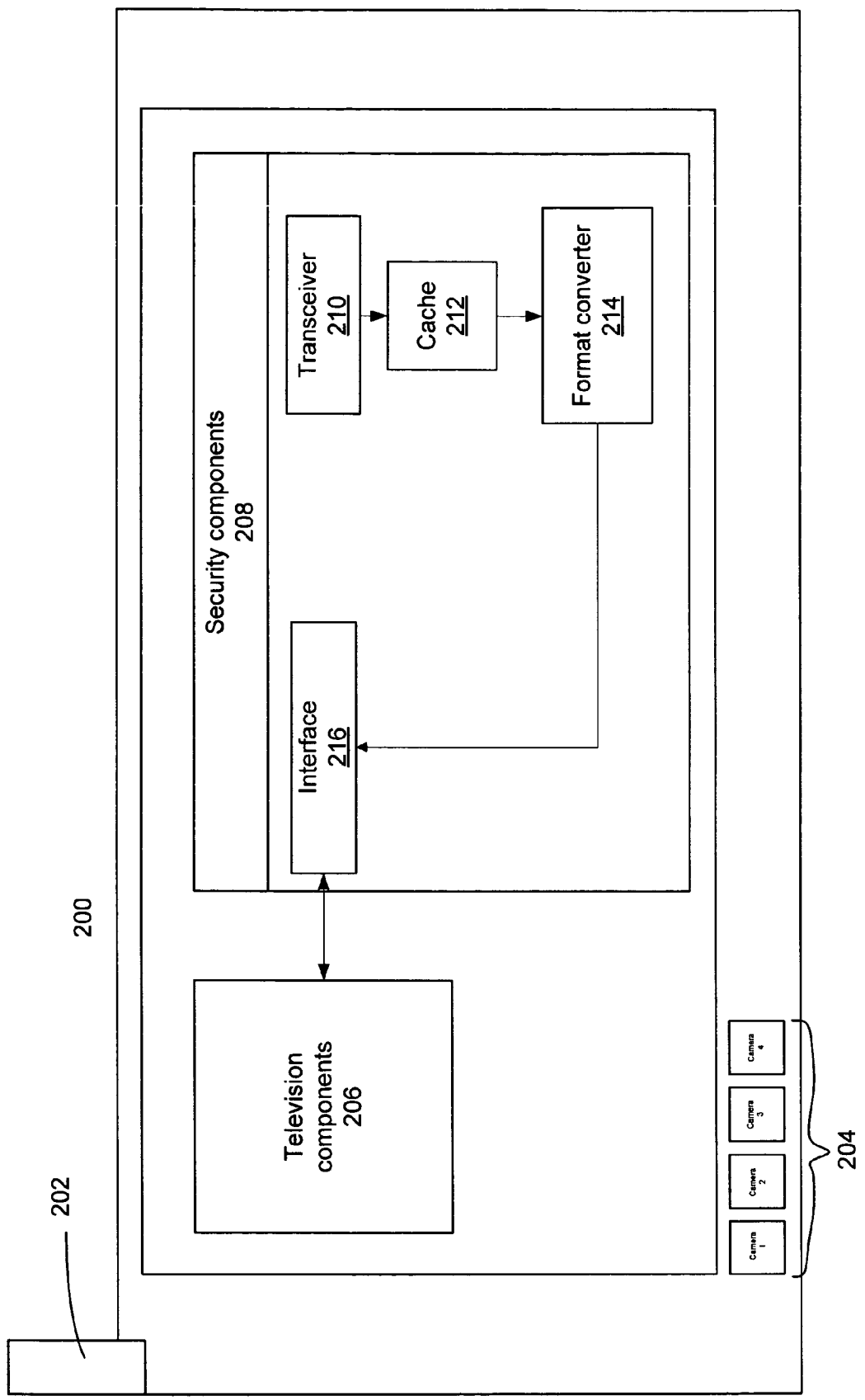
FIG. 2 is a block diagram of a set top box in accordance with the illustrative embodiments of the present invention.

FIG. 2 is a block diagram of an television in accordance with the illustrative embodiments of the present invention. The set top box 200 of FIG. 2 includes various components and modules. The set top box 200 is one implementation of the set top box 103 of FIG. 1. The set top box 200 of FIG. 2 includes various physical components which may include a wireless antenna 202, and camera view selectors 204. The wireless antenna 202 is the communication element for sending and receiving signals from wireless cameras, a router, a personal computer, a cell phone, a doorbell, a home network and other wireless communication devices in the home. Camera view selectors 204 are a particular implementation of camera view selectors 128 described relative to FIG. 1. The set top box 200 may also be hardwired to a home network using cable, Ethernet, fiber optics, telephone, or other wiring schemes. In addition, the set top box 200 includes various internal components including television components 206, and security components 208.

The television components 206 are the components that allow the set top box 200 to display regular media content such as cable, satellite, video feeds, or other media frequently displayed on a set top box 200. The television components 206 may include elements, such as a tuner, hard disk for recording or downloading media, circuitry, memory, and a processor used to display media and other content to the user. The security components 208 are those components used to display the security content as herein described. The security components 208 include a transceiver 210, a cache 212, a format converter 214, and an interface 216.

The transceiver 210 works in conjunction with the wireless antenna 202 to transmit and receive signals from wireless cameras, such as front door camera 120 of FIG. 1. The transceiver 210 may use any communications protocol or media to transmit wireless information to the wireless cameras and to a personal computer or wireless router, such as the personal computer 108 and the wireless router 110 of FIG. 1. This allows the user to control the content and configuration of media that is streamed to the set top box 200.

The cache 212 may be a memory storage device for buffering or otherwise storing data received through the transceiver 210. The data or security content is stored in the cache 212 and then transferred to the format converter 214. In one embodiment, the format converter 214 is a program that converts the security content sent by the wireless cameras to a format that is properly displayed on a display in communication with the set top box 200. However, the format converter 214 may be a hardware device such as a video card or specially designed integrated circuit, or other software application suitable for converting the security content sent by the wireless cameras to a format that is displayable using the set top box 200.

The formatted security content is sent from the format converter 214 to the interface 216. In one embodiment, the interface 216 interconnects the security components 208 and the television components 206. The interface 216 ensures that the data is properly displayed to the television and user according to the preferences already established. For example, the preferences may set whether security content altogether replaces normal viewing is displayed in multiple windows, or is shown using varying levels of transparency.

The set top box 200 may include any number of camera view selectors 204. The camera view selectors 204 are configured to display a wireless camera view or security content from a wireless camera when activated. For example, the user may program the set top box 200 to display images from a front door camera when a first button is pushed. The user may also program other buttons or indicators that are part of the camera view selectors 204 to display views from other wireless cameras based on user preferences and personal or security needs.

Figure 3:
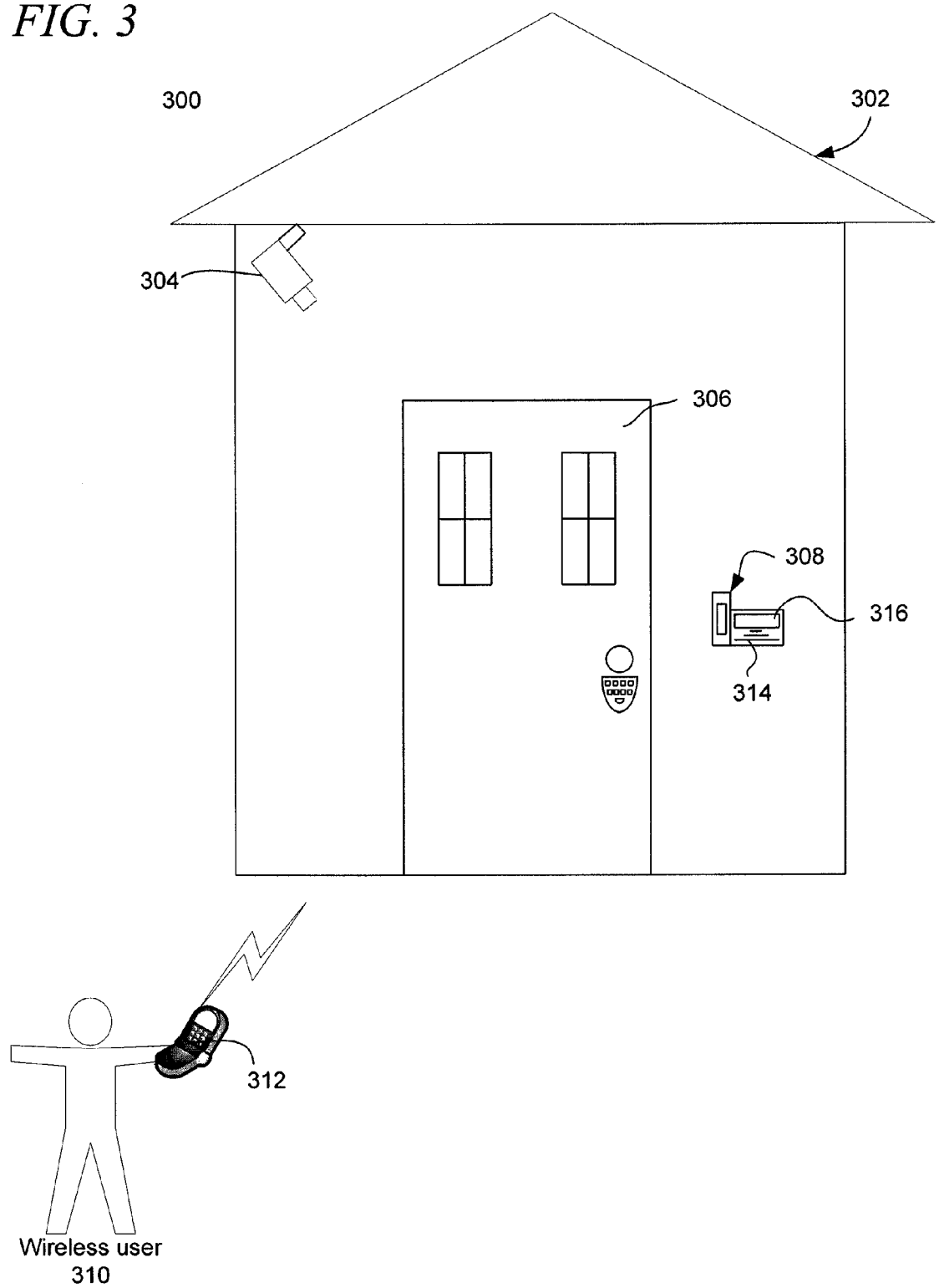
FIG. 3 is an exemplary security system working in connection with a cell phone in accordance with the illustrative embodiments of the present invention.

FIG. 3 is an exemplary security system working in connection with a cell phone in accordance with the illustrative embodiments of the present invention. A security system 300 of FIG. 3 includes various elements. In one embodiment, the security system 300 includes a home 302, a front door camera 304, a door 306, a doorbell 308, a wireless user 310, and a cell phone 312. The home 302 is a building, such as the home 100 of FIG. 1. In one embodiment, the home 302, and the wireless user 310 are in different geographic locations. The security system 300 of FIG. 3 allows the wireless user 310 to view security content from the front door camera 304 despite being in a different geographic location. The front door camera 304 is a camera, such as front door camera 112 of FIG. 1.

The doorbell 308 may be a smart device including a processor, memory, antenna, wireless transceiver and other components for implementing the features herein described. The doorbell 308 may be hardwired to power and communications lines of the home 302. Alternatively, the doorbell 308 may be a battery powered and self-contained wireless unit. The doorbell 308 communicates with the front door camera 304 and other wireless devices, such as the wireless router 110 of FIG. 1 for sending and receiving data. For example, when the doorbell 308 is pushed or activated by an individual, the doorbell may instruct the front door camera to stream live data, record a video, or take a still image of the person at the door 306 to send to the cell phone 312 or the set top box 103 of FIG. 1. The doorbell 308 may be equipped to send and receive network signals directly or through broadcast devices using protocols such as Bluetooth®, WiFi, WiMAX™, CDMA, GSM, and other wireless protocols and standards.

In one embodiment, the doorbell 308 may include a speaker 314 and display 316. The speaker 314 or the front door camera 304 may be equipped with a microphone for communicating information from an individual present at the door 306 to the wireless user 310. The speaker 314 may use Internet Protocol telephony to send a voice signal to the cellular phone 312. The speaker 314 may also use voice recognition to determine the identity of the individual pressing the doorbell 308. For example, the doorbell 308 may prompt a user to read a specified phrase, give a password, or "Say your name." The doorbell 308 may use voice recognition to send a predefined alert, chime or signal to the cell phone 312. For example, the user may program the doorbell to play "The boys are back in town" to the cell phone 312 anytime the voice or image of a son of the family is identified.

Alternatively, the user may designate different ring tones, songs, or other audio messages based on the individual recognized at the doorbell 308. Such ring tones, songs, and audio messages may be stored on the cell phone 312 and triggered for playing on the cell phone 312 when an individual is identified by the doorbell 308.

The display 316 is a graphical interface for sending and receiving information from the doorbell 308. The display 316 may display text, video, graphics, and other streaming or recorded data. The display 316 may also include a touch screen or text pad for typing words and numbers. In one embodiment, the display 316 may also be integrated with the front door camera for recording images directly from the doorbell 316 and image recognition. In another embodiment, the display 316 is used to display a text message sent by the wireless user 310 using the cell phone 312. However, the display 316 may be any device suitable for displaying content or a graphical representation from the cell phone 312. In another example, the wireless user 310 may send streaming video of himself/herself to be displayed by the display 316 of the doorbell 308, such as telling girl scouts to come back later to deliver an order of cookies. The doorbell 308 may have an identifier, such as an email address, messaging identifier, or text identification for sending messages directly to the doorbell 308.

In one example, the wireless user 310 may use the cell phone 312 to transmit an image or video of the wireless user 310 authorizing an individual present at the door 306 to leave a package at the door step. The security system 300 of FIG. 3 may be used in various manners. In one embodiment, an individual may approach the home 302 and press the doorbell 308. A wireless signal is sent from the doorbell 308 to the cell phone 312. In one embodiment, the wireless signal from the doorbell 308 may be sent through a wireless router such as wireless router 110 of FIG. 1. In another embodiment, a wireless signal may be sent from the doorbell 308 through a personal computer 108 of FIG. 1 and transmitted via a wireless connection to the cell phone 312. An alert or security content from the front door camera 304 is then displayed to the wireless user 310 on the cell phone 312.

In one embodiment, the cell phone 312 is a cell phone equipped to receive streaming video, pictures or other content. However, the cell phone 312 may be any wireless communication element or device suitable for receiving wireless communications. The wireless user 310 may use the security content from the front door camera 304 to view individuals present at the home 302. Alternatively, the wireless user 310 may use the security content displayed on the cell phone 312 to unlock or otherwise grant access to the home 302 through the door 306. In one embodiment, the doorbell 308 and the door 306 may electronically interface to allow the door 306 to be opened remotely. In another example, the wireless user 310 may receive security content indicating that the spouse of the wireless user 310 is present at the door 306 but does not have keys to the home 302. The wireless user 310 may push a button on the cell phone 312 or otherwise send a signal that unlocks the door 306 or otherwise grants access to the home 302.

The security content from the front door camera 304 is displayed to the user automatically using different methods. In one embodiment, the security content is transmitted to the wireless user 310 once the doorbell 308 has been activated or pushed. In another embodiment, the security content is sent from the front door camera 304 to the cell phone 312 based on a motion sensing mechanism of the front door camera 304. For example, if the front door camera 304 detects a prowler, the motion sensor of the front door camera 304 automatically transmits a video clip of the prowler to the cell phone 312. The wireless user 310 may use the security content to call the police or take other security measures to protect the home 302. The security content may be displayed to the user 310 on one or more displays of the cell phone 312.

The cell phone 312 may chime, ring, emit a tone, vibrate or otherwise indicate to the wireless user 310 that security content is being received from the front door camera 304 or in response to the doorbell 308 being pressed. In one embodiment, the wireless user 310 may link specific chimes, ring tones, or cell phone 312 actions with the doorbell 308 or other security cameras. For example, when the doorbell 308 is pushed the cell phone 312 may make a door bell sound, such as "ding dong." When the cell phone 312 receives a signal from a back door camera, the cell phone may play a designated song. This feature lets the wireless user 310 be alerted to the doorbell 308 even if the home 302 is very large or the wireless user 310 is in the backyard or at a remote location. Additionally, the use may have different doorbells at different locations such as home, home office, apartment, art studio, workshop, or work address. Each doorbell may have a distinct ring tone, song, chime or other cell phone indicator for indicating the presence of an individual.

The cell phone 312 may also receive a textual confirmation of a camera identifier of the wireless camera. The camera identifier is a name, number or other text identifier assigned by default or by the user that identifies the wireless camera and may identify the location of the wireless camera. For example, the camera identifier accompanying a still or video image may state, "Camera 1—Front Door Camera." This function may be particularly useful when the wireless user 310 has multiple wireless cameras installed in the home 302, such as home 100 of FIG. 1. The security content sent from the front door camera 304 may be video clips, still images, or streaming data, as requested by the user. Security content received by the cell phone 312 may be received as a text message, voicemail or phone call. In one embodiment, an icon and alert may be displayed to the phone indicating that security content is being uploaded to the phone. The security content may also be stored on a cellular network for access by the wireless user 310 at a time and place of convenience. In yet another embodiment, the security content may be downloaded directly from the set top box to the cell phone when requested by the wireless user 310.

The wireless user 310 may use the cell phone 312 to configure how the security content is received and displayed to the wireless user 310. For example, the wireless user 310 may select to automatically display the security content including streaming data, video, or photos to the cell phone 312 when received. Alternatively, the wireless user 310 may select to first receive an alert and then based on the alert, the wireless user may manually elect whether or not to display the data. As previously mentioned, the alert may be linked to specific devices.

Figure 4:
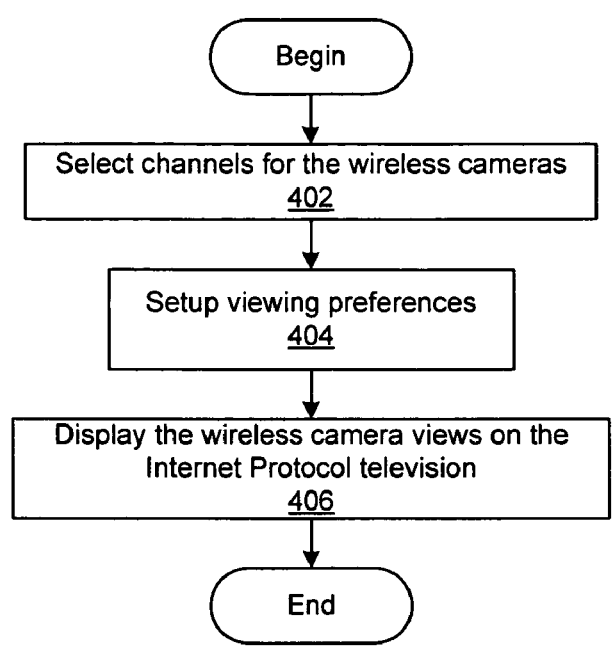
FIG. 4 is a flow chart for a process for establishing preferences for a set top box in accordance with the illustrative embodiments of the present invention.

FIG. 4 is a flow chart for a process for establishing preferences for a set top box in accordance with the illustrative embodiments of the present invention. The process of FIG. 4 is used to establish preferences and a configuration for a set top box for viewing security content from a wireless camera and a television. A user may be prompted to complete this process each time a new wireless security camera is detected by the television, or manually, as selected by the user. For example, when a new camera is installed, a user may be prompted to complete the process of FIG. 4 using a set top box and a television.

The process of FIG. 4 begins by selecting channels for the wireless camera [Step 402]. For example, the user may elect to use a channel, such as channel 99 to view the security content from the wireless camera. The security content from the one or more wireless security cameras may be displayed on a single channel mosaic or on multiple channels. In one embodiment, content from up to six wireless cameras may be displayed on a single channel. Channels that are unused by the user for regular television content may be blocked or otherwise dedicated to display security content from the security cameras. For example, a front door camera, a nursery camera, a garage camera, and a back yard camera may be configured so that the content is displayed on channels 100, 101, 102, and 103 of the television. Additionally, all recorded security content captured may be viewed at a later time on channel 104.

Next, the process sets viewing preferences [Step 404]. The preferences may include any number of preferences and configurations for displaying security content. In one embodiment, camera selection buttons are assigned to each of the wireless security cameras and the user establishes how the security content is displayed to the television. For example, security content may be shown transparently over the normal viewing content of the television, such as a cable television program.

In another embodiment, the user may set viewing preference so that security content fully replaces the normal viewing content of the television. For example, as the user is watching a movie, activity detected by one of the wireless cameras may trigger the television to display only the relevant security camera until the user selects to return to normal viewing. Viewing preferences may also specify which camera selection indicators are used by the remote control and how the user may change between security content of the different security cameras. The set top box may also be configured to use a picture-in-picture configuration for displaying security content to the user.

During step 404, the user may also configure the set top box to send an alert to other devices through a wired connection or wirelessly to indicate that security content is being received or was previously recorded. For example, the user may enter a text message address allowing the set top box to send messages to a cell phone when live security content is received from a front door camera.

Next, the process displays the camera views on the television [Step 406] with the process terminating thereafter. The views are displayed in Step 406 to allow the user to verify that the security content is displayed in accordance with the pre-established viewing preferences. Additionally, showing the camera views allows the user to verify that the one or more wireless cameras are functioning properly and displaying security content that is relevant and useful.

Figure 5:
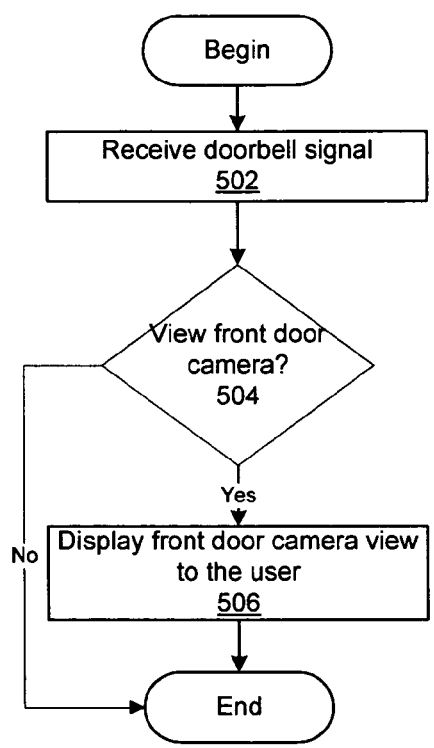
FIG. 5 is a flow chart of a process for security system interactions in accordance with the illustrative embodiments of the present invention.

FIG. 5 is a flow chart of a process for security system interactions in accordance with the illustrative embodiments of the present invention. The process of FIG. 5 may be implemented by a home security system on a set top box. The process begins by receiving a doorbell signal [Step 502]. The doorbell signal may be transmitted directly to the set top box using a wireless transmission protocol. For example, as a user selects or pushes the doorbell, a WiMAX™ signal may be sent from the doorbell and received by the set top box.

Next, the process determines whether to view the front door camera [Step 504]. The determination of Step 504 is made by a user based on information received through the television. For example, once the doorbell signal is received in Step 502, an alert, indicator, or pop-up box may be flashed to the user on the television. The alert may state the camera has detected activity, a camera identifier such as backyard camera—camera 4, and how the camera was activated, such as "doorbell" or "motion sensor." At that point, the user may press a button on a remote control, the set top box, or on the television itself, to select to view the front door camera.

If the process determines to view the front door camera, the process displays the camera view to the user [Step 506]. The camera view is the security content streamed or otherwise recorded by the wireless security camera. The camera view may be displayed on the television according to user preferences established by the user in a process such as FIG. 4. If the process determines not to view the front door camera in Step 504, the process terminates. FIG. 5 allows a user to interactively use security content from wireless cameras to better provide security and personal needs. In another embodiment, the security content is automatically displayed by the set top box to the television without user interaction.

Figure 6:
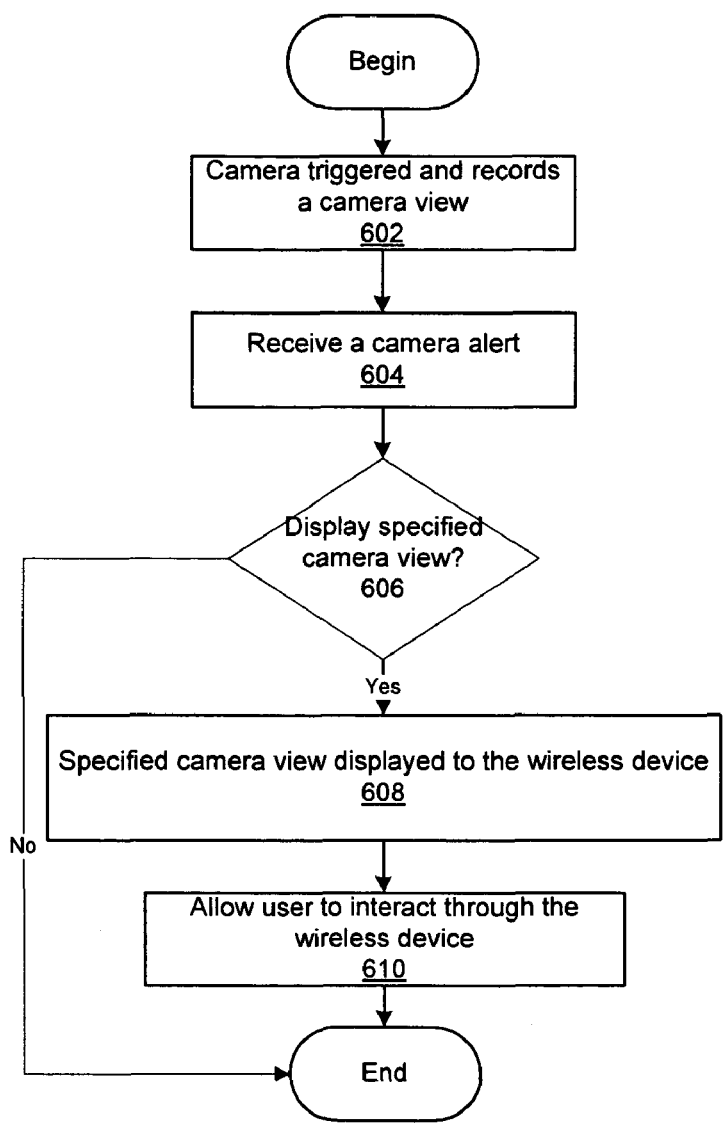
FIG. 6 is a flow chart for a process for interacting with a security system using a cell phone in accordance with the illustrative embodiments of the present invention.

FIG. 6 is a flow chart for a process for interacting with a security system using a cell phone in accordance with the illustrative embodiments of the present invention. The process of FIG. 6 may be implemented by a wireless security system that is interconnected with a wireless device, such as a cell phone. The process begins by a triggered camera recording a camera view [Step 602]. In one embodiment, the camera may be triggered by a doorbell. In another embodiment, the security camera may be motion sensitive for detecting the presence of individuals or motion. In one embodiment, the wireless camera includes on-board memory for storing hours or days of recent content. In other embodiments, the camera view may be recorded to a personal computer, or may be streamed directly to a wireless device. The camera view may be sent in Internet protocol packets or may be sent directly through a cellular network.

Next, the wireless device receives a camera alert [Step 604]. The camera alert may be an audible or touch-sensitive signal, such as a vibration, that indicates that a signal is being received from a wireless camera. Next, the process determines whether to display the specified camera view [Step 606]. The determination of Step 606 is made automatically, or based on user-established options, setting or preferences by user input into the wireless device. For example, once a camera alert is received in Step 604, the user may select to view the camera view or security content by pushing a button, saying a key word or phrase, or otherwise indicating to the wireless device. If the process determines to display the specified camera view, the specified camera view is displayed to the wireless device [Step 608]. The security content may be displayed on one or more displays of the wireless device to show the user who or what is being recorded by the wireless camera.

Next, the process allows the user to interact through the wireless device [Step 610]. In one embodiment, the user may send a text message that is displayed to a doorbell at the home of the user. In another embodiment, the user may use a camera or video recording device of the wireless device to record videos or send streaming data to be received by an individual at the user's doorstep. In yet another embodiment, the user may type a text message and send the text message to a doorbell device using the wireless device. Each embodiment allows the user to interact with an individual or group at the user's home without actually being present. In another embodiment, the user may use the wireless device to grant access to the home of the user by entering a key code or other password that unlocks the door at the user's home. In one embodiment, the security content is automatically displayed by the cell phone without user interaction.

Figure 7:
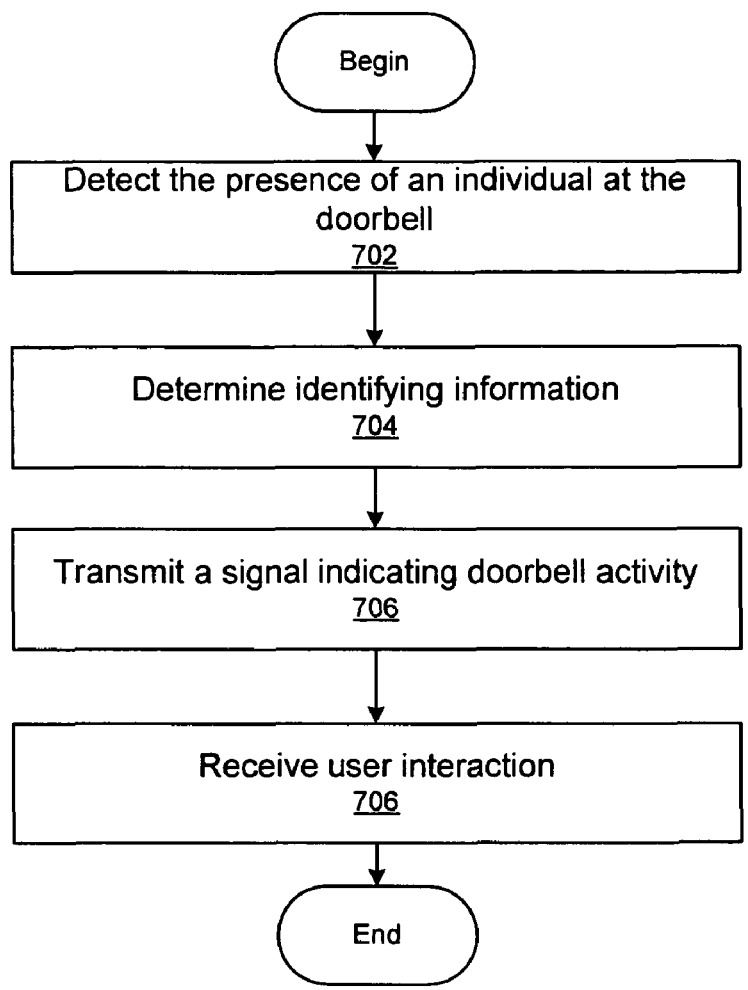
FIG. 7 is a flowchart for a process for sending a doorbell signal in accordance with the illustrative embodiments of the present invention.

FIG. 7 is a flowchart for a process for sending a doorbell signal in accordance with the illustrative embodiments of the present invention. The process of FIG. 7 may be implemented by a home security system and particularly by a security enhanced doorbell. First, the process begins by detecting the presence of an individual at the doorbell [step 702]. The individual may be detected based on a user action, such as pressing the doorbell or speaking. The individual may also be detected based on a pressure sensitive mat, motion detection, laser, infrared, body temperature, or other active detection devices or sensor interconnected with the doorbell.

Next, the doorbell determines identifying information [step 704]. During step 704, the doorbell may use various resources to identify the individual at the door. For example, the doorbell may request that the user give a name, voice identifier, enter a password or text, scan a radio frequency identifier, or pose for a picture or video to be recorded. The doorbell may use this information to identify the individual at the door.

Next, the doorbell transmits a signal indicating doorbell activity [Step 704]. The doorbell activity is detected in Step 702. The signal may be sent by a transceiver of the doorbell. The signal may be sent directly to another device or may be sent through an interconnected wireless network. For example, the signal may be sent to a wired or wireless camera, a set top box, a home router, a home computer, a television, or a cell phone. In one embodiment, the signal may be an alert indicating that the doorbell was pressed. In another embodiment, the signal may activate a wireless camera and set top box for streaming security content to the set top box and connected television. The doorbell may also include a camera that records or streams wireless images from the doorbell as part of the signal. The signal may include or link to security content in the form of an image, recorded video, or streaming video. The signal may also include the identifier determined in Step 704 and information regarding time, date, location, a message from the individual, and/or voice and image recognition data. The signal may be sent as a call, alert, or message.

The doorbell may communicate with a cellular network using a Time Division Multiple Access (TDMA), Code Division Multiple Access (CDMA), Global System for Mobile Communications (GSM) or other similar cellular network. The signal may be routed through the cellular network to the cell phone as a call, message, or alert signal. For example, the signal may be treated like a text message or voicemail that is sent to the cell phone. The signal is routed to the cell phone using gateways, registries, and other cellular components normally used by the cellular network. If necessary the signal may be converted or formatted for compatibility with the cellular network and the cellular phone.

In another embodiment, the signal is sent to a set top box, router, or personal computer that routes the signal to the cellular phone. The signal may need to be routed from an Internet protocol network, such as the Internet, through a Short Message Service (SMS) or text message gateway used by a service provider compatible with the cell phone. For example, the doorbell may communicate the signal over an 802.11g home network to a home router that communicates the signal over the Internet as a SMS message to the cellular phone.

Next, the doorbell receives user interaction [Step 708]. The user interaction may be similar to the interaction described in step 610 of FIG. 6. The user may use the cell phone to speak through the doorbell, send a message, authorize entrance into the home or building, or send other images, video, sound clips or information.

The illustrative embodiments of the present invention provide a system and method for communicating recent content from wireless content. The security content may allow a user to interact with individuals through a set top box and a cell phone. The security content is recorded or streamed to the set top box and cell phone providing the user additional security and peace of mind while not at home. For example, a security system such as security system 300 of FIG. 3 may sporadically record security content based on activity around the home. The recorded security content may be stored to wireless cameras, personal computer, television, digital video recorder, website or other storage device. The user may view the recorded security content based on a received alert or at the user's discretion. For example, the alert may be an email or text message sent to the user indicating new recorded security content has been recorded and is available.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for displaying security content from a set top box, the method comprising:
   receiving a signal that a camera has been activated at the set top box, the camera being activated in response to detecting a presence at a location of the camera, the set top box being operable to display television content to the display;
   automatically streaming an image from the set top box to a cell phone registered in viewing preferences;
   communicating an alert to a display in communication with the set top box in response to receiving the signal, the alert indicating the signal has been received, the alert being communicated utilizing the viewing preferences;
   receiving an image streamed from the camera to the set top box, wherein the set top box communicates with a plurality of cameras including the camera, each of the plurality of cameras being associated with one or more dedicated channels displayable to the display by the set top box;
   automatically recording the image received from the camera by the set top box in response to activation of the camera; and
   displaying the image to the display.

2. The method according to claim 1, further comprising:
   wherein the camera sends a security content to the cell phone over an Internet Protocol network, wherein the security content is accessed by the cell phone utilizing an email, text message, instant message, or hyperlink.

3. The method according to claim 2, wherein one or more of the plurality of cameras is a wireless camera.

4. The method according to claim 2, further comprising:
   sending a signal to the cell phone indicating that a doorbell has been activated in response to the doorbell being activated.

5. The method according to claim 3, wherein the user selects a stream from one of the plurality of wireless cameras utilizing a remote control for display by the set top box to the display.

6. The method according claim 1, further comprising:
   sending alert to the cell phone indicating the camera is activated according to the viewing preferences; and
   receiving input from a user for determining whether to display a security content on the cell phone.

7. The method according to claim 6, wherein the alert is any of the email text message, instant message, and hyperlink.

8. The method according to claim 4, wherein the camera is activated in response to a selection of a doorbell or motion being detected.

9. The method according to claim 1, wherein the displaying further comprises:
   replacing media content communicated to the display with the image until user input is received;
   receiving user interaction from a user using the cell phone, wherein the user interaction is any of voice, text, or video transmitted to a location of the wireless camera.

10. The method according to claim 9, wherein the image is displayed over the media content in an overlay.

11. The method according to claim 4, further comprising:
    powering on the display in response to activation of any of the plurality of cameras, and wherein the set top box communicates the image to a plurality of displays.

12. The method according to claim 1, wherein the image is any of a video, streaming video, still image, and graphic.

13. The method according to claim 5, wherein the set top box indicates to a user that one or more images have been recorded for review, wherein the set top box indicates a time and a camera identification for the one or more messages that have been recorded.

14. A cell phone security system comprising:
    a doorbell for indicating that an individual is present at the doorbell, wherein the doorbell sends a signal indicating the doorbell is activated;
    a plurality of wireless cameras including a wireless camera communicating with the doorbell for recording security content of the individual at the doorbell, wherein the wireless camera automatically records the security content when the signal is received;
    a set top box in wireless communication with the wireless camera operable to receive the security content, the set top box being operable to display the security content from the plurality of wireless cameras on a television, the set top box being operable to display television content to the television, and wherein each of the plurality of wireless cameras being associated with one or more dedicated channels displayable to the television by the set top box; and
    a cell phone communicating with the set top box, the set top box automatically streaming the security content to the cell phone registered within viewing preferences of the set top box, the cell phone indicates to a user that the signal is received and displays the security content to the user.

15. The cell phone security system according to claim 14, wherein the doorbell includes a microphone for receiving voice input from the individual, a speaker for outputting voice data, an interface for identifying the individual, a transceiver for sending the security content and receiving data from the user to the set top box, a lock interface for unlocking a door in response to a user selection communicated to the doorbell from the cell phone, and a display for displaying text and images to the individual.

16. The cell phone security system according to claim 14, wherein the wireless camera sends the security content to the cell phone over an Internet Protocol network, wherein the security content is accessed by the cell phone utilizing an email, text message, instant message, hyperlink.

17. The cell phone security system according to claim 14, wherein the set top box displays an indicator that the security content is being received and temporarily displays a image to the television, wherein the set top box includes a digital video recorder and displays television content to the television, wherein the set top box displays an interface that allows a user to manage recorded security content by one of the plurality of wireless cameras and time; wherein the cell phone plays a specific sound indicating that the security content is received, and wherein the set top box powers on the television in response to receiving security content when the television is powered off.

18. The cell phone security system according to claim 14, further comprising:
a remote control in communication with the set top box, the remote control including camera selectors for viewing an image from one or more of the plurality of wireless cameras on the television in response to a user selection, wherein the camera selectors are associated with one or more dedicated channels of the plurality of wireless cameras, and wherein the user interacts with the individual using voice, video, text, or images sent through the cell phone.

19. A method for indicating security content is available to a cell phone, the method comprising:
registering the cell phone with a set top box, the set top box being operable to manage security content from a plurality of cameras, the set top box being operable to display television content;
receiving an indication that the security content is received, the indication specifying whether the security content is live or recorded and a camera identifier;
playing a sound linked with the security content;
displaying the security content from one or more of a plurality of cameras associated with a building;
automatically displaying the security content to the cell phone from the set top box;
recording the security content received from one or more of the plurality of cameras by the set top box; and
sending user interactions that are transmitted from the cell phone to a location of the one of more of the plurality of cameras sending the security content.

20. The method according to claim 19, wherein the set top box displays the security content to a television in communication with the set top box until user input is received from a remote control, the set top box displaying the security content to the television utilizing picture in picture, wherein the set top box identifies an individual in the security content utilizing an identifier, wherein the user interactions unlocks a door at a location of one of the plurality of cameras.

* * * * *